Figure 1:
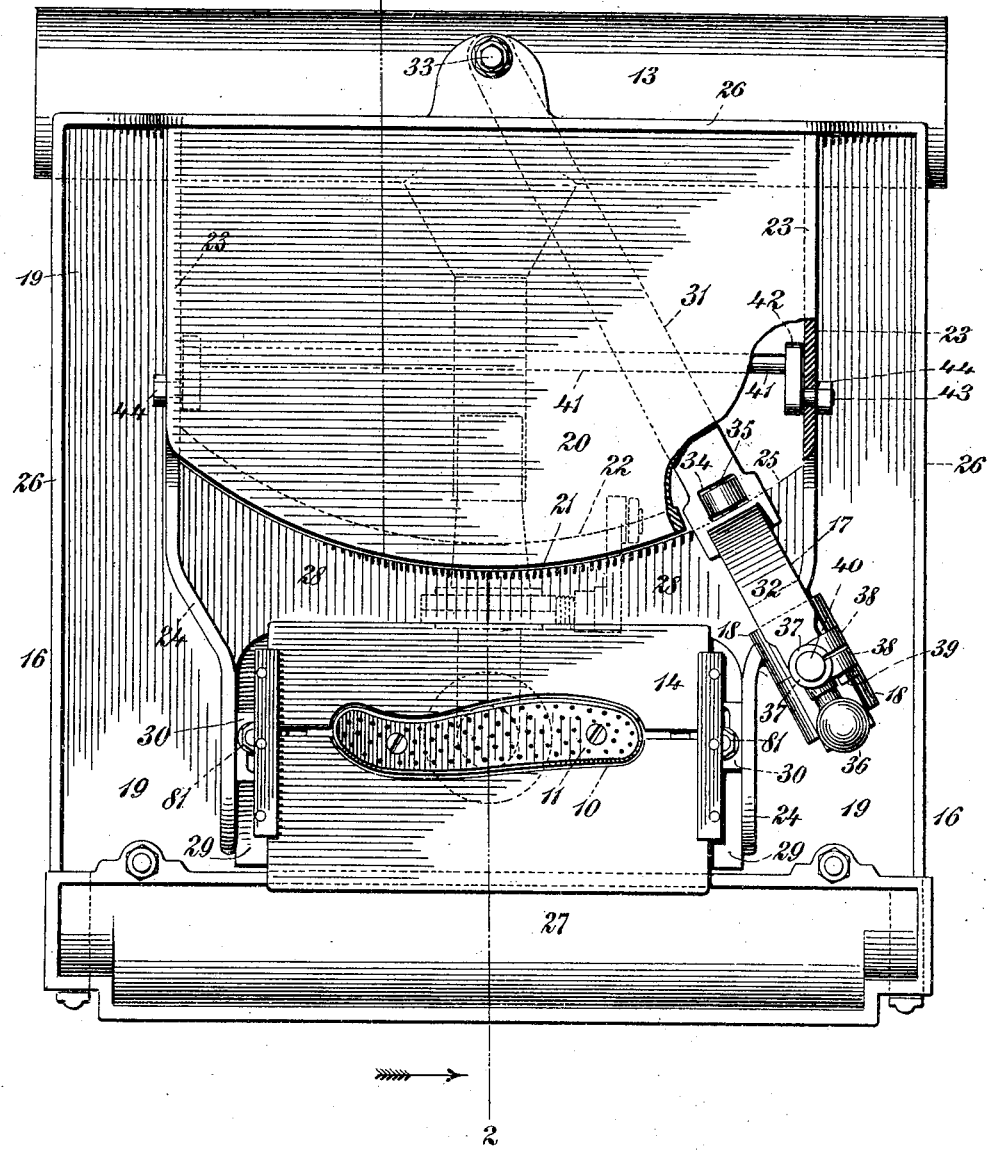

No. 767,620. PATENTED AUG. 16, 1904.
J. R. WILLIAMS.
COMBINED CIGAR WRAPPER CUTTER AND ROLLING TABLE.
APPLICATION FILED APR. 17, 1901.
NO MODEL. 3 SHEETS—SHEET 1.

WITNESSES:
Gustave Dieterich
John Kehlenbeck

INVENTOR
John R. Williams
BY
Chas. C. Gill
ATTORNEY

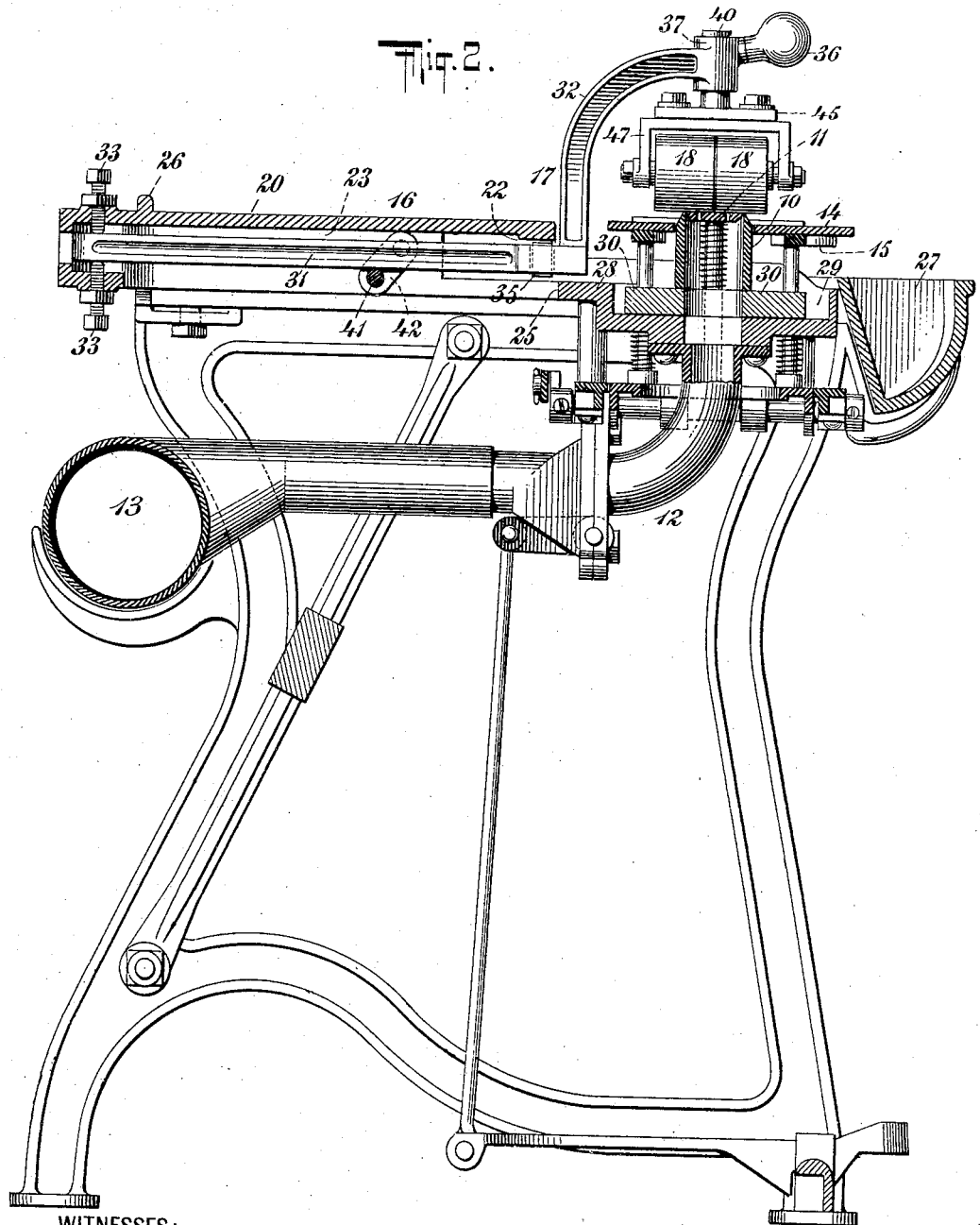

No. 767,620. PATENTED AUG. 16, 1904.
J. R. WILLIAMS.
COMBINED CIGAR WRAPPER CUTTER AND ROLLING TABLE.
APPLICATION FILED APR. 17, 1901.
NO MODEL. 3 SHEETS—SHEET 3.
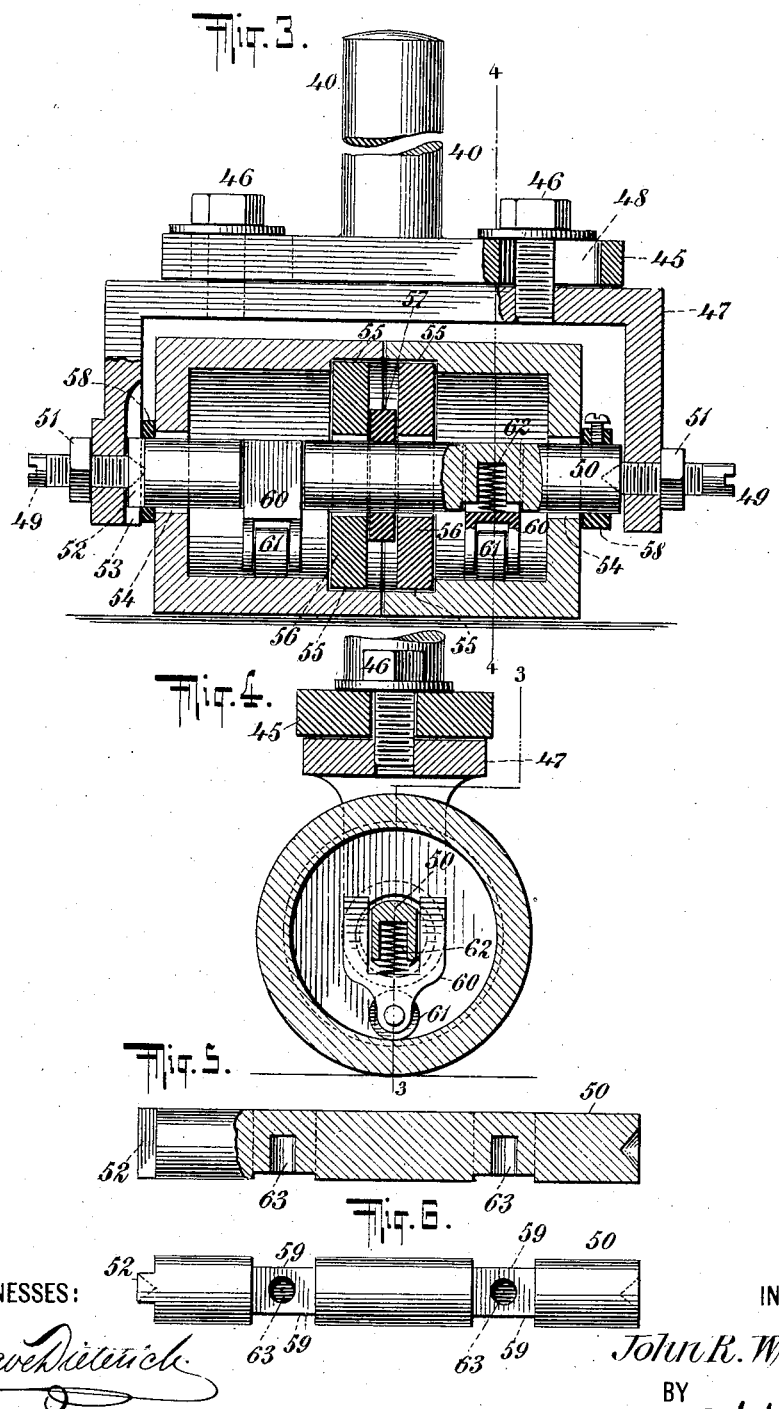
WITNESSES: INVENTOR
John R. Williams
BY
ATTORNEY No. 767,620. Patented August 16, 1904.

UNITED STATES PATENT OFFICE.

JOHN R. WILLIAMS, OF EAST ORANGE, NEW JERSEY, ASSIGNOR TO THE JOHN R. WILLIAMS COMPANY, OF NEW YORK, N. Y., A CORPORATION OF NEW YORK.

COMBINED CIGAR-WRAPPER CUTTER AND ROLLING-TABLE.

SPECIFICATION forming part of Letters Patent No. 767,620, dated August 16, 1904.

Application filed April 17, 1901. Serial No. 56,200. (No model.)

*To all whom it may concern:*

Be it known that I, JOHN R. WILLIAMS, a citizen of the United States, and a resident of East Orange, in the county of Essex and State of New Jersey, have invented certain new and useful Improvements in a Combined Cigar-Wrapper Cutter and Rolling-Table, of which the following is a specification.

The invention relates to improvements in combined cigar-wrapper cutters and rolling-tables, and pertains more especially to improvements in the character of machine described in Letters Patent of the United States No. 400,153, granted March 26, 1889, to John R. Williams for improvements in machines for cutting out cigar wrappers or binders.

The present invention has for its object to improve and render more efficient and desirable the machine shown and described in the said Letters Patent No. 400,153, and the said invention has relation more especially to the cutting-rollers for coöperation with the die, as hereinafter pointed out.

The invention will be fully understood from the detailed description hereinafter presented, reference being had to the accompanying drawings, in which—

Figure 1 is a top view, partly broken away, of a combined wrapper-cutter and rolling-table constructed in accordance with and embodying the invention. Fig. 2 is a vertical section of same on the dotted line 2 2 of Fig. 1. Fig. 3 is an enlarged central vertical longitudinal section through the rollers and their parts, which are carried by the roller-arm and adapted for coöperation with the wrapper-cutting die. Fig. 4 is a vertical transverse section of same on the dotted line 4 4 of Fig. 3. Fig. 5 is a detached side elevation, partly in longitudinal section, of the roller-shaft; and Fig. 6 is a bottom view of same.

It will be observed upon a comparison of the machine shown in the present drawings with the drawings of the aforesaid Patent No. 400,153 that many of the features of the present construction are substantially identical with the construction shown in said patent, and it will not be necessary, therefore, to refer in detail to all of the features of the present machine, since the novel features made the subject of this application are confined to the top bed-plate, the roller-arm, and the rollers, with their parts, carried by said arm. Some of the features present alike in the accompanying drawings and in the aforesaid Patent No. 400,153 will, however, be briefly referred to.

In the drawings, 10 designates a wrapper-cutting die containing a perforated platen 11 within its upper cutting edges and having its interior chamber connected by a pipe 12 with a horizontal pipe 13, the latter being connected, as usual, with a suction-blower (not shown) for creating suction within the space below the perforated platen 11, whereby the tobacco-leaf may be held upon the die 10 and platen 11 by air-suction during the operation of cutting a wrapper from the leaf, the wrapper being subsequently held upon said platen by air-suction during the operation of rolling said wrapper around the filler to form the cigar. Surrounding the cutting-die 10 is ordinarily provided a rolling-table 14, preferably made in two parts, as shown, one part being at each side of the die 10. The rolling-table 14 is, as fully set forth in the aforesaid Patent No. 400,153, preferably mounted upon a frame 15, which is vertically movable, whereby during the cutting of the wrapper from the leaf the table 14 may be allowed to remain in its lower position (shown in Fig. 2) and then, preparatory to the rolling of the cigar, said table may be elevated, so that its upper surface shall be on a level with the upper edges of the die 10 and, with the perforated platen 11, form an extended surface for the convenience of the operator in rolling the cigars. The table 14 and frame 15 may be raised and lowered by any suitable means; but I recommend for this purpose the employment of the mechanism shown in said Patent No. 400,153, which is substantially duplicated in the present machine. The die 10, perforated plate 11, air-pipe 12, rolling-table 14 and frame 15, referred to above, are not in themselves claimed in the present application, since said parts do not vary in any special particular from the like parts of the machine shown in said Patent No. 400,153.

The top bed-plate of the machine is designated as a whole by the numeral 16, the roller-arm by the numeral 17, and the rollers for coöperating with the die 10 by the numeral 18, and these features, numbered 16, 17 and 18, with their necessary coöperative parts, alone constitute the subject of the present application.

The top bed-plate 16 is mounted, as usual, upon side-supporting legs or frames, and said top bed-plate comprises the table portion 19 and the table portion 20, the table portion 20 being centrally disposed at the rear part of the bed-plate 16 and being on a higher elevation than the table portion 19. The front edge of the table portion 20 is curved, as at 21, and below this curved front edge of the table portion 20 is formed the tramway 22, (indicated by dotted lines in Fig. 1,) said tramway 22 extending from end to end of the lower surface of the front edge of said table portion 20. The elevated table portion 20 has vertical sides 23, which are extended forward toward the front edge of the bed-plate by the convergent vertical flanges 24, which rise from the lower table portion 19, which between the rear ends of the flanges 24 terminates in a curved edge 25. There is an open space between the front curved edge 21 of the upper table portion 20 and the curved rear edge 25 of the lower table portion 19, and in this space the roller-arm 17 moves pivotally when actuated.

The sides and rear end of the bed-plate 16 is encompassed by the vertical flange 26, which serves to retain the scraps of tobacco upon the bed-plate. At the front end of the bed-plate 16 is provided a suitable trough 27 to receive tobacco-leaves and which trough is of known construction and not claimed herein. The flanges 24 are about the same height as the flange 26, and hence the table portion 19 between the flanges 24 and the flange 26 is adapted to retain the tobacco which may be placed or fall thereupon, said flanges preventing the tobacco from falling over the side edges of the bed-plate or passing inward to that portion of the table 19 marked 28 and disposed at the rear of the cutting-die 10 and between the flanges 24, it being my purpose to keep the portion 28 of the bed-plate substantially clear of tobacco or refuse. Between the front portions of the flanges 24 is formed in the bed-plate a depression or recess 29, within which the plate 30, carrying the die 10, is secured in a well-known manner, said plate 30 being preferably secured, as indicated in Fig. 1, by bolts 81 passing downward through elongated slots formed in the ends of said plate. The depression or elongated recess 29 forms a receptacle to receive the plate 30 and permits the lower table portion 19 to serve the convenience of the operator and to avoid having the front portion of the roller-arm 17 extended upward to an undue or inconvenient extent. The front portions of the flanges 24 are at the opposite ends of the elongated recess or depression 29 and prevent scraps of tobacco from passing into said recess.

The roller-arm 17 comprises a horizontal member 31 and a front member 32, the latter rising from the front end of the horizontal member 31 and then extending forwardly, as shown in Figs. 1 and 2. The rear end of the roller-arm 17 is centered, so as to have a free horizontal action upon the pivot-screws 33 33, whence the horizontal member 31 of said roller-arm extends below the elevated table portion 20 and at its front end projects slightly forward of the curved edge 25 of the portion 28 of the bed-plate. The horizontal member 31 of the roller-arm 17 has in its front portion the vertical aperture 34, in which a roller 35 is journaled, said roller being adapted to engage and travel along the tramway 22, which is directly over said roller and at the under side of the front portion of the elevated table part 20. The front end of the horizontal member 31 of the roller-arm 17 only projects a slight distance forward of the front edge of the table portion 20, and from this forwardly-projecting front end of the horizontal member 31 arises the member 32 of said roller-arm, said member 32 extending vertically and then turning forwardly and being provided at its front extremity with a handle 36, by which the arm 17 may be manually operated. The front member 32 of the roller-arm 17 is formed with the vertical split sleeve 37, whose portions have formed with them the lugs 38 38, adapted to receive the clamping-screw 39, by which the said sleeve 37 may be tightened against the vertical standard 40, by which the rollers 18 are suspended from the front end of the roller-arm 17 in position to be moved over the cutting edges of the die 10 for the purpose of severing a wrapper from the tobacco-leaf to be placed over said die. The sleeve 37 and lugs 38 are cast with the roller-arm 17; but there is sufficient yield in the metal to enable the clamping-screw 39 to tighten the sleeve 37 on the standard 40.

The horizontal member 31 of the roller-arm 17 rides upon a transverse rod 41, which is secured in the lower ends of the arms 42, the upper ends of said arms 42 being secured by bolts 43 and nuts 44 to the inner vertical surface of the sides 23, supporting the table portion 20. The bolts 43 serve as pivots upon which the arms 42 and rod 41 may be swung, and the nuts 44, when tightened against the sides 23, serve to fasten the arms 42 and rod 41 in any position to which said parts may be adjusted. It is desired that the rod 41 shall serve as a support for the horizontal member of the roller-arm 17 without unduly binding against said member, and hence the rod 41 is secured by means which permit of its adjustment toward or from the horizontal member 31 of the roller-arm, whereby said rod may be caused to press against the said horizontal member 31 with as much or as little force as required. When the rod 41 is moved into proper relation to the member 31, the nuts 44 will be tightened against the sides 23, so that said rod 41 may thereafter remain in rigid position.

The horizontal member 31 of the roller-arm 17 is kept from springing upward, especially while the rollers 18 are traveling over the die 10, by reason of the tramway 22 being at the upper side of the roller 35, and this is an important feature of the construction, since with the form of the roller-arm shown in the aforesaid Patent No. 400,153 it was customary for the operator when the rollers were passing over the tobacco-leaf on the die to pull downward on the front end of the roller-arm, so as to create sufficient pressure to cut the wrapper from the leaf, the downward force exerted by the operator becoming necessary in some cases because of the tendency of the roller-arm to yield slightly upward when meeting the increased thickness of material over the cutting-die. With the present construction of roller-arm the said arm is prevented from springing upward at any time, and especially while the rollers 18 are traveling over the die 10, by reason of the fact that the roller-arm possesses the horizontal member 31, traveling below the elevated table portion 20, and that the front part of the table portion 20 constitutes a tramway, against which the roller 35 of the arm 17 may travel. With the use of the roller-arm 17 and tramway 22 the operator does not have to press downward on the front end of the roller-arm when the rollers 18 are traveling over the die 10, it being only necessary with the present construction that the operator move the roller-arm, so as to carry the rollers 18 longitudinally over the die 10. The transverse rod 41, supporting the member 31 of the roller-arm 17, is also of importance, because it prevents any sagging downward of the front portion of the roller-arm 17, and said rod 41 and tramway 22 at the opposite sides of the roller-arm serve to define a space within which the roller-arm is confined and guided and positively held against springing upward or sagging downward.

The standard 40 is a plain cylindrical stem adapted to be secured within the sleeves 37, provided at the front end of the roller-arm 17, and said standard 40 has at its lower end a base-plate 45, to which is secured, by means of the bolts 46, the roller-frame 47, said frame 47 being adjustable laterally along the base-plate 45, so that the rollers 18 may pass into proper central alinement with the cutting-die 10. The bolts 46 pass downward through the slots 48 in the base-plate 45, as shown in Fig. 3, and hence permit of the adjustment of the roller-frame 47 when necessary. The frame 47 has in its opposite vertical sides threaded apertures to receive the pointed screws 49, upon which the roller-shaft 50 is centered. The screws 49 are equipped with jam-nuts 51, whereby they may be prevented from working loose under usual conditions. The shaft 50 is prevented from rotating by reason of the fact that at one end it is provided with a vertical rib 52, which when in position is within a vertical groove 53, formed in one end of the frame 47, as shown in Fig. 3, the engagement of the rib 52 with the walls of the groove 53 preventing the shaft 50 from turning.

Upon the shaft 50 is placed the hollow rollers 18 18, in whose outer ends are formed the apertures 54, through which the shaft 50 passes and which are sufficiently greater in diameter than said shaft to enable the rollers 18 to have a limited upward-and-downward motion while rotating upon said shaft. At their inner ends the rollers 18 are formed with the annular grooves or recesses 55, within which are placed the disks 56, said disks being less in thickness than the width of the grooves 55, and hence when the ends of the rollers 18 18 come together, as shown in Fig. 3, a space is formed between the disks 56 of sufficient capacity to receive the interposed plate or disk 57, which closely fits upon the shaft 50 and has no yielding motion thereon. The disks 56 have central apertures, through which the shaft 50 passes, and which apertures correspond with the apertures 54 in the outer ends of the rollers 18, so that the disks 56 may have a limited upward-and-downward movement while rotating upon the shaft 50. The disks 56 constitute substantially the inner ends of the rollers 18 and are made removable simply for convenience in assembling the other parts of the mechanism, as will be presently understood. At the outer ends of the rollers 18 are provided upon the shaft 50 the close-fitting collars 58. Within the interior of the rollers 18 the shaft 50 is formed on opposite sides with the vertical grooves 59 to receive the vertically-yielding shoes 60, whose upper portions are bifurcated to straddle the shaft 50 and enter and be guided in the grooves 59 of said shaft. The lower ends of the shoes 60 carry the rollers 61 to press against the lower inner walls of the rollers 18, as shown in Fig. 4, and which are yieldingly pressed against said walls by means of the interposed springs 62, seated within recesses 63 of the shaft 50 and exerting a downward force against the shoes 60 and rollers 61, whereby the said rollers are caused to yieldingly press against the lower inner walls of the rollers 18 and impart to said rollers 18 a downward yielding tension. The shoes 60 have no rotary motion, but simply have a vertically-yielding motion upon the stationary shaft 50.

During the operation of the machine made the subject hereof the tobacco-leaf will be spread over the die 10, and while said leaf is there held by air-suction the rollers 18 will be moved over said leaf, so as to press the same against the die 10 and cause the latter to cut the wrapper from the leaf. During the passage of the rollers 18 over the tobacco-leaf it is advisable that the rollers yieldingly press the leaf upon the die, and for this reason the rollers 18 are equipped with the springs 62, by which said rollers are caused to yieldingly press downward and to yield upward under the variations of the thickness which may be met in tobacco-leaves to be operated upon. It is not, broadly, new to employ a pair of yielding or spring-pressed rollers in a machine of this character, since a pair of such rollers is shown in the aforesaid Patent No. 400,153. It is also essential that during the vertical yielding motion of the rollers 18 said rollers shall not tilt endwise upon their shaft, and this is of special importance, since experience has taught that the pressure-rollers are liable to tilt endwise and to become ineffective in causing the proper severance of the tobacco-leaf. In the present instance the rollers 18 are not only under a spring tension and capable of yielding vertically to a limited extent, but the construction is such that said rollers while capable of independently yielding are prevented from during such movement tilting endwise. When the rollers 18 meet the die 10 and are pressed upward, the springs 62 will be compressed within the recesses 63 by the moving upward of the shoes 60, the latter being pressed upward by the action of the small rollers 61, carried by said shoes. During the upward motion of the rollers 18 said rollers are prevented from tilting endwise by reason of the fact that the inner adjoining ends of the rollers 18, represented by the disks 56, will ride against the flat side surfaces of the interposed plate or disk 57 and that the outer ends of the rollers 18 will ride against the flat surfaces presented by the washers 58, the said rollers 18 being thus guided vertically and being prevented from tilting endwise. The enlarged openings in the outer ends of the rollers 18 and in the disks 56 enable the rollers 18 to have a vertical movement, and in the absence of means to guide the said rollers while having their vertical movement the said rollers would tilt endwise and have an unequal action upon the tobacco-leaf to be treated. The small rollers 61, carried by the shoes 60, are adjacent to the lower portions of the rollers 18, and when in this position the said rollers 61 also aid in preventing endwise tilting of the rollers 18, and more especially so since the bifurcated upper portions of the said shoes 60 are guided in the recesses 59, formed in the opposite sides of the stationary shaft 50. By making the rollers 18 hollow, as shown in Fig. 3, the operator is saved from being compelled to move any excess of metal or weight while operating the machine, and in addition I am thereby enabled to place the tension-roller 61 within the rollers 18 and have them press downward against the lower portion of the said rollers and operate within the reduced diameter represented by the interior bore of said rollers 18 in lieu of arranging the tension-rollers in the manner shown in said Patent No. 400,153, in which they press against the top and at the exterior side of the rollers. I apply a heavy lubricant within the interior of the rollers 18, so that during the rotation of said rollers 18 but little friction is created between their inner surfaces and the tension-rollers 61.

From the foregoing description and in view of the well-known condition of the art to which the invention pertains the operation of the machine made the subject of this application will be readily understood without further detailed explanation.

The machine hereinbefore described less the cutting-rollers 18 and their coöperating features has been made the subject of Letters Patent No. 688,276, granted to John R. Williams December 3, 1901, on an application divided out of this application.

What I claim as my invention, and desire to secure by Letters Patent, is—

1. In a machine of the character described, the die in the outline of the wrapper to be cut, combined with the oscillatory roller-arm, the roller-frame suspended from said arm, the shaft 50 carried by said roller-frame, the rollers 18 loosely mounted upon said shaft so as to yield vertically thereon while rotating, and the spring-pressed rollers 61 below said shaft and within the interior of said rollers 18 and pressing against said rollers 18 below said shaft; substantially as set forth.

2. In a machine of the character described, the die in the outline of the wrapper to be cut, combined with the roller-arm, the roller-frame suspended from said arm, the shaft 50 carried by said roller-frame, the rollers 18 loosely mounted upon said shaft so as to yield vertically while rotating, means for yieldingly exerting a downward pressure against said rollers, and the plate 57 on said shaft and concealed within a recess intermediate the adjoining meeting ends of said rollers and affording flat surfaces contacting with flat surfaces at the ends of said rollers and for guiding said rollers vertically and preventing endwise tilting motion in the same; substantially as set forth.

3. In a machine of the character described, the die in the outline of the wrapper to be cut, combined with the roller-arm, the roller-frame suspended from said arm, the shaft 50 carried by said roller-frame, the rollers 18 loosely mounted upon said shaft so as to yield vertically thereon while rotating, means for yieldingly pressing said rollers downward, the disks 56, the recesses 55 formed in the adjacent ends of said rollers and receiving said disks 56, the plate 57 on said shaft and concealed between said disks 56 and within the adjacent outer portions of said recesses 55 unoccupied by said disks, and means at the outer ends of said rollers for coöperating with said plate 57 in preventing endwise tilting motion in said rollers 18; substantially as set forth.

4. In a machine of the character described, the die in the outline of the wrapper to be cut, combined with the roller-arm, the roller-frame suspended from said arm, the shaft 50 carried by said roller-frame, the rollers 18 loosely mounted on said shaft so as to yield vertically thereon while rotating, the shoes within the hollow interior of said rollers and guided on said shaft, the springs engaging said shoes to exert a downward force against the same, and the rollers carried by said shoes and engaging the inner walls of said hollow rollers below said shaft; substantially as set forth.

5. In a machine of the character described, the die in the outline of the wrapper to be cut, combined with the roller-arm, the roller-frame suspended from said arm, the shaft 50 carried by said roller-frame, the rollers 18 loosely mounted on said shaft so as to yield vertically thereon while rotating, the shoes within the hollow interior of said rollers and having bifurcated upper portions fitting within vertical side grooves in said shaft to be guided vertically thereby, the springs seated within recesses in said shaft and arranged to press downward against the central portion of said shoes, and the rollers carried by said shoes and engaging the inner walls of said hollow rollers below said shaft; substantially as set forth.

6. In combination with a supporting-shaft, a hollow roller loosely journaled thereon to permit of a movement transverse of the shaft, and a reciprocating rod supported by said shaft, provided at one extremity with an antifriction-wheel, and spring-actuated to engage with the inner periphery of the roller for exerting yielding pressure, substantially as described.

Signed at New York, in the county of New York and State of New York, this 15th day of April, A. D. 1901.

JOHN R. WILLIAMS.

Witnesses:
   CHAS. C. GILL,
   GUNDER GUNDERSON.